United States Patent [19]

Moulton

[11] Patent Number: 4,902,181

[45] Date of Patent: Feb. 20, 1990

[54] SPRING ACTION FASTENER

[76] Inventor: Anthony D. Moulton, 305 Melbourne, Columbia, Mo. 65201

[21] Appl. No.: 308,614

[22] Filed: Feb. 10, 1989

Related U.S. Application Data

[62] Division of Ser. No. 632,050, Jul. 18, 1984, Pat. No. 4,812,097.

[51] Int. Cl.$^4$ .............................................. F16B 21/00
[52] U.S. Cl. ..................................... 411/347; 411/350; 411/508; 411/913
[58] Field of Search ................. 411/16, 341, 342, 343, 411/344, 349, 350, 352, 347, 508, 913, 182, 6, 12, 70, 39, 33, 38, 37, 34, 35, 36, 337; 24/590

[56] References Cited

U.S. PATENT DOCUMENTS

| | | | |
|---|---|---|---|
| 2,549,793 | 4/1951 | Francesco | 411/349 X |
| 2,696,138 | 12/1954 | Olschwang | 411/341 |
| 2,877,818 | 3/1959 | Johnson | 411/347 X |
| 3,649,059 | 3/1972 | Davidson | 411/347 X |

FOREIGN PATENT DOCUMENTS 573227 11/1945 United Kingdom ................ 411/349

Primary Examiner—Rodney M. Lindsey
Attorney, Agent, or Firm—Kokjer, Kircher, Bradley, Wharton, Bowman & Johnson

[57] ABSTRACT

A one piece fastener which uses spring action to fasten parts together. The fastener has a body which is inserted into a drilled aperture in the parts. An enlarged head on one end of the body is too large to enter the aperture. A spring on the other end of the body is normally too large to enter the aperture but can be retracted to a size to pass through the aperture. A stud has its head connected to the spring and its opposite end in threaded engagement with an internally threaded passage extending through the body of the fastener. Turning of the stud by a special tool applies a torsional force to the spring which retracts it so that the fastener can be applied to or removed from the fastened parts. Alternative embodiments of the invention employ various types of multiple stage springs to enhance the fastening power.

6 Claims, 3 Drawing Sheets

SPRING ACTION FASTENER

This is a division of application Ser. No. 632,050, filed July 18, 1984, now U.S. Pat. No. 4,812,097.

BACKGROUND OF THE INVENTION

This invention relates generally to the field of fastening devices and deals more particularly with a fastener which employs spring action to fasten parts together.

Although conventional fastening devices function in an entirely satisfactory manner for the most part, there is considerable room for improvement in many respects. For example, fasteners such as rivets are at best difficult to remove without unduly damaging the fastener and the fastened parts. Other types of fasteners such as conventional screws and other threaded fasteners are not able to adequately fasten some materials and do not always fasten with adequate security. Vibration can loosen or dislodge some fasteners, as can the application of shear forces. When forces are exerted in a manner tending to pull fastened articles apart, many types of fasteners either fail or loosen and thus lose their holding power.

The various types of "blind" fasteners that have been developed such as "blind" rivets can be applied in cases where only one side of the work is accessible. However, removal of these blind fasteners is not easily accomplished and in most cases is impossible without mutilating the fastened objects and destroying the fastener so that it can not be used again.

Another problem with many existing fasteners is the time and difficulty involved in assembling and/or applying the fastener to the parts that are to be fastened. Versatility is an additional problem in that fasteners which function well in some applications are totally unsuitable for other applications. The various types of specialized fasteners that are available are characterized by high costs, due in large part to their multiple piece construction.

So called "quarter turn" and "quick release" fasteners are constructed to quickly release from the work pieces, usually by simply turning the fastener through an arc of approximately 90°. However, fasteners of this type are unduly expensive and have limited applicability. In addition, this type of fastener is usually characterized by a number of parts which must fit together in order for the fastener to function as intended.

SUMMARY OF THE INVENTION

The present invention is directed to a fastener which is improved in many respects in comparison to the fasteners that have been available in the past.

More specifically, it is an important object of the invention to provide a fastener which employs spring action to securely hold together panels or other parts. The use of a deformable spring allows the fastener to be applied to virtually any part and gives the fastener considerable holding power because of the expansion of the spring when applied to the fastened parts.

Another object of the inventinon is to provide a fastener which is self-locking and which is readily able to withstand vibration and other forces. This feature is accomplished through the use of a threaded stud in conjunction with a spring element which is expanded when the fastener is fully applied to the fastened parts. The threaded connection between the stud and fastener body, acting in concert with the spring force, causes the fastener to tighten rather than loosen when subjected to vibrational forces. Accordingly, the fastener of the present invention is especially well suited for applications in which vibration is expected.

Still another object of the invention is to provide a fastener which can be applied when only one side of the work is accessible and which can be removed without damaging either the fastened parts or the fastener itself. The applicability of the fastener in "blind" fastening situations enhances its versatility. At the same time, the removability of the fastener allows it to be detached and used again in additional fastening operations.

An additional object of the invention is to provide a fastener which can be quickly and easily applied to and detached from the fastened articles. All that is required to apply the fastener is a two step procedure which involves the formation of an aperture in the parts and subsequent installation of the fastener into the aperture with a special tool. Removal is even more easily carried out and involves the use of the special tool to retract the spring, followed by withdrawal of the fastener from the aperture.

A further object of the invention is to provide a fastener which is formed in a single integral piece. This minimizes the cost and complexity of the fastener and avoids the frequently encountered situaiton where the various parts of a multiple part fastening assembly become separated thus essentially rendering the fastener useless.

Yet another object of the invention is to provide a fastener which firmly holds fastened articles together and is able to withstand considerable tension and shear loads. Several embodiments of the invention have one or more springs located within the aperture in the fastened parts. The springs expand against the parts within the aperture to apply an added holding force and also permit one of the parts to be detached while the fastener continues to grip the other part or parts.

In another form of the invention, a coiled spring is included in the fastener and is lcoated within the aperture of the fastened parts. The spring permits the parts to shift laterally relative to one another as the spring serves as a shock absorber to absorb the shear forces that are applied to the parts. The coil spring also provides the fastener with the ability to easily accommodate slight misalignment of the apertures in the parts. Additionally, the spring is stretched when the fastener is fully applied and thereby applies a compressive force holding the panels or other fastened parts securely together.

A still further object of the invention is to provide a fastener which can be used with virtually any fastened parts and which can be fitted in apertures having virtually any shape.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
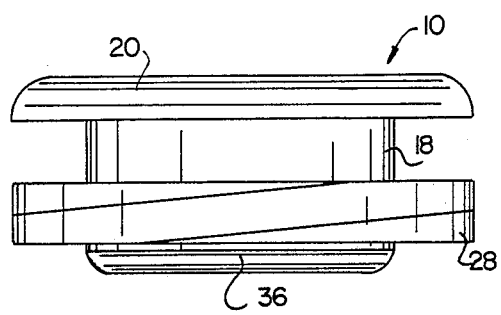
FIG. 1 is a side elevational view of a fastener constructed according to one embodiment of the present invention, with the helical spring included in the fastener in its expanded undeformed state.
Figure 2:
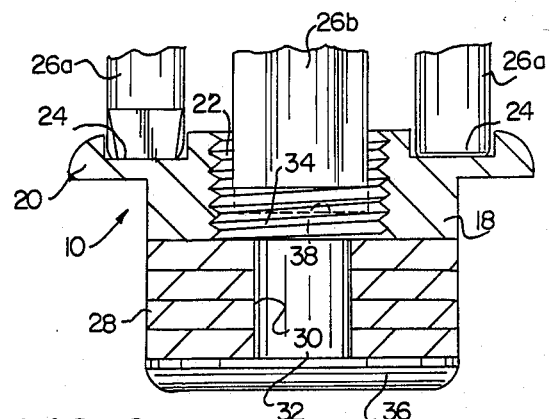
FIG. 2 is a sectional view of the fastener shown in FIG. 1, with a tool applied to deform the spring to its radially retracted condition.
Figure 3:
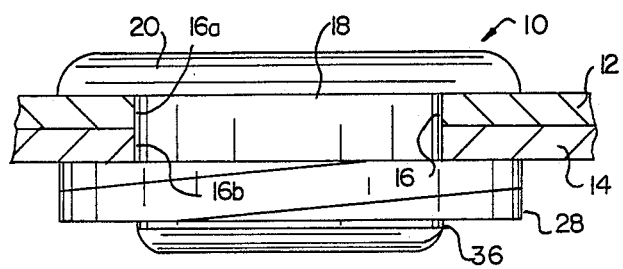
FIG. 3 is an elevational view showing the fastener of FIG. 1 applied to fasten a pair of panels.
Figure 4:
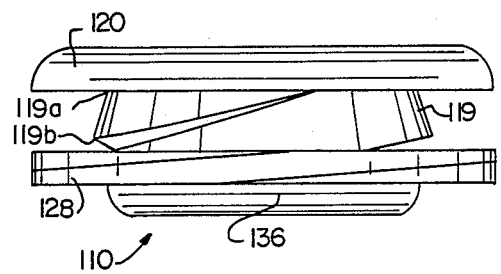
FIG. 4 is a side elevational view of a fastener constructed accoridng to a second embodiment of the present invention, with both springs included in the fastener in their expanded undeformed conditions.
Figure 5:
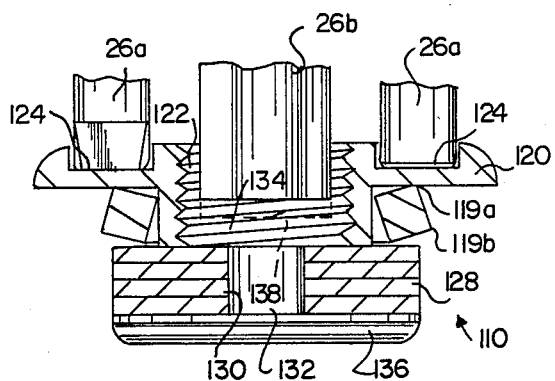
FIG. 5 is a sectional view of the fastener shown in FIG. 4, with a tool applied to retract one of the springs to its fully retracted condition.

Referring now to the drawings in more detail and initially to FIGS. 1-3, numeral 10 generally designates a fastener constructed in accordance with a first embodiment of the present invention. The fastener 10 is used to fasten together a pair of parts such as flat panels 12 and 14 shown in FIG. 3. The panels 12 and 14 are provided with an aperture 16 which is normally circular but which may take on various alternative shapes such as oval, square, or rectangular. The aperture 16 can be formed by drilling holes 16a and 16b through the respective panesl 12 and 14. The holes 16a and 16b are of identical size and shape and are aligned with one another to form the aperture 16.

The fastener 10 includes a body 18 which has the same size and shape as the aperture 16. Normally, the body 18 is cylindrical. An enlarged head 20 is formed on one end of body 18 and is considerably larger than the aperture 16. The head 20 presents a flat surface which rests against panel 12 when the fastener is installed in the manner shown in FIG. 3. Extending axially through the body 18 and head 20 is an internally threaded passage 22 (see FIG. 2). The outwardly facing surface of head 20 is provided with a pair of diametrically opposed recess 24 for receiving prongs 26a of a tool which is used to install and remove the fastener. The tool also includes a rotatable shank 26b which can be rotated and axially advanced or withdrawn while the prongs 26a remain stationary.

The end of body 18 opposite the head 20 connects with a spring 28. Preferably, the spring 28 is a double helical spring, having two spiral spring elements, although another type of spring can be used. The two helices or spirals which form the spring connect at one end with the body 18. In its normal free or undeformed condition, the spring 28 assumes the expanded position shown in FIGS. 1 and 3. In this condition, the spring has a larger diameter than the aperture 18. When the spring is subjected to a torsional force (or to tension), it is deformed to the retracted condition shown in FIG. 2 in which the diameter of the spring is slightly less than the diameter of body 18 and the aperture 16. In the retracted condition, the spring 28 can be passed through the aperture 16.

Spring 28 has a central passage 30 through which a stud 32 extends. Stud 32 serves to control spring 28 in a manner that will be made clear. One end of stud 32 is externally threaded at 34, and the other end of the stud is provided with an enlarged head 36 having substantially the same diameter as the body 18. The spiral spring elements which form the spring 28 connect with the stud head 36 at the end of spring 28 opposite the end that connects with the body 18. The threaded end 34 of the stud 32 mates with the internally threaded passage 22 and is provided with a recess 38 for receiving the shank 26b of the tool which is used to install and remove the fastener. Both the recess 38 and the tool shank 26b have a hexagonal shape or other means permitting the tool to rotate stud 32 when shank 26b is turned.

The fastener 10 is formed in a single piece, with the spring 28 being connected at one end with body 18 and at the opposite end with the stud head 36. Fastener 10 and all other fasteners described herein can be made of metal, plastic or any other suitable material. The opposite ends of the helices which form spring 28 can be connected with the body 18 and stud head 36 by welding or in any other suitable manner.

The fastener 10 is installed with the aid of the special tool having the rotatable shank 26b and the two prongs 26a which are stationary in order to hold the body 18 as the tool shank 26b is rotated. The tool is applied to the fastener by inserting the prongs 26a into the recesses 24. Shank 26b fits in recess 38 and is rotated in a direction to thread the stud 32 generally away from the body 18. The threaded connection between the stud and body causes the stud head 36 to rotate and to move away from the body, thereby applying torsional force to the helical spring 28. This torsional force causes the spring to retract generally radially and to elongate axially. When the spring has been fully retracted to the condition shown in FIG. 2, it is small enough to pass through the aperture 16 in the panels 12 and 14 that are to be fastened together. It should be evident that spring 28 applies a torsional force to stud 32 when the spring is deformed from its free condition.

The fastener 10 is applied by holding spring 28 in the retracted condition and inserting the fastener into the aperture 16. When the head 20 has contacted panel 12 to limit movement of the fastener into the aperture, the spring 28 has moved completely through the aperture beyond the surface of panel 14. Body 18 has a length substantially equal to the length of the aperture 16 and completely occupies the aperture.

When the fastener has been fully inserted into the aperture, the tool can be released, and the spring 28 expands by spring action to its normal undeformed condition. This causes the spring to expand radially and retract axially to the position shown in FIG. 3 in which the spring has a size greater than the aperture 16. Then, the panels 12 and 14 are securely held between the head 20 on one side and the expanded spring 28 on the other side. Expansion of spring 28 rotates stud 32 and causes its threaded end 34 to advance into passage 22.

When installed in this fashion, the fastener 10 is self-locking in that the force applied by spring 28 tends to pull the head 20 toward the spring, thereby locking the fastener in the fastening position. Vibration and other forces that tend to dislodge or loosen other fasteners are ineffective to loosen the fastener 10 since the spring cannot be retracted without turning of the stud 32 in order to thread the threaded end 34 of the stud out of the internally threaded passage 22 in the fastener body. Accordingly, the fastener is secured against vibratioal forces and other externally applied forces. The function of the externally threaded stud and internally threaded passage can be performed by other arrangements such as a cross pin on the stud working in a spiral groove in the passage.

It is noted that the fastener 10 is suited for "blind" fastening situations when only one side of the work is accessible such as the exposed surface of panel 12. The fastener can be fully applied from the exposed side of panel 12 and can be removed without damaging either the fastener or the fastened parts. Removal of the fastener requires the application of the tool to retract spring 28, and it is noted that the recesses 24 and 38 aqe accessible from the exposed side of the fastener. Retraction of the spring involves rotation of shank 26b to turn stud 32 while prongs 26a hold body 18 against rotation. When the tool has been applied to effect retraction of the spring 28, the fastener can simply be withdrawn through the aperture 16 without mutilating or otherwise damaging either the fastener or the panels 12 and 14.

Referring now to FIGS. 4–7, numeral 110 generally designates a second embodiment of the fastener which is in many respects identical to the fastener 10. The main difference is that the body of fastener 110 is comprised itself of a double helical spring structure 119 having a generally frusto-conical configuration in its free or undeformed condition. Spring 119 has a root portion 119a which is substantially equal in diameter to the aperture 116 of the panels 112 and 114 which are to be fastened. Spring 119 has a larger base portion which is somewhat larger in diameter than the aperture 116 and which presents an edge 119b.

Spring 128 of fastener 110 is identical to spring 28. Spring 119 is somewhat stiffer than spring 128.

The fastener 110 is applied by inserting the prongs 26a of the application tool into the recesses 124 in head 120 and rotating the tool shank 26b while same is received in the recess 138 formed in the threaded end 134 of stud 132. Rotation of the tool shank initially causes spring 128 to retract radially to the fully retracted position shown in FIG. 5. Spring 119 is stiffer than spring 128 so that the torsional force initially retracts the weaker spring 128.

Figure 6:
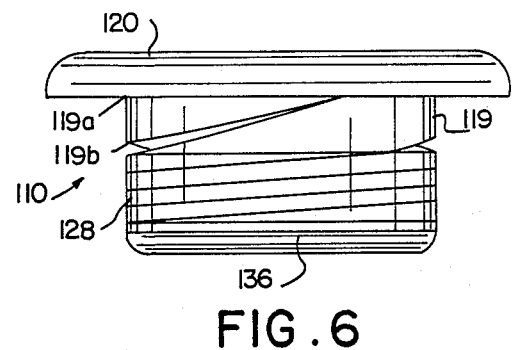
FIG. 6 is an elevational view similar to FIG. 4 but showing the fastener with both springs fully retracted.
Figure 7:
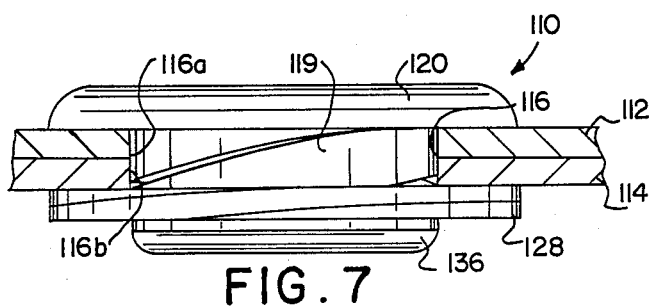
FIG. 7 is an elevational view showing the fastener of FIG. 4-6 applied to fasten a pair of panels.
Figure 8:
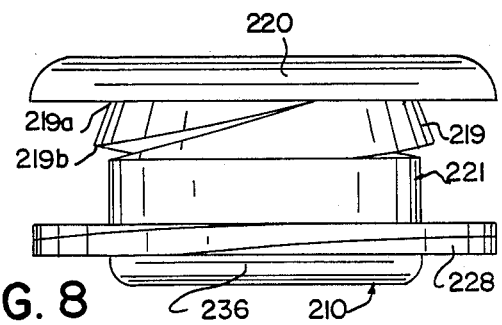
FIG. 8 is a side elevational view of a fastener constructed according to a third embodiment of the present invention, with both springs in their undeformed conditions.

Additional rotation of the tool shank causes the second spring 119 to retract to the position shown in FIG. 6 in which spring 119 is small enough to pass through the aperture 116. The fastener 110 is inserted through aperture 116 in this condition and is released after head 120 has engaged the outer panel 112. Spring 119 then expands by spring action such that its base portion edge 119b exerts an outward force on panel 114 and thereby grips against and bites into the panel 114 at a location within the aperture 116. The other spring 128 expands to a size greater than aperture 116 in the same manner indicated previously in connection with FIGS. 1–3.

The gripping action exerted by spring 119 against panel 114 at a location within the aperture 116 cooperates with spring 128 to increase the fastening power of the fastener 110. In all other respects, the fastener 110 functions in the same manner as fastener 10 and is self-locking and secure against vibrational forces. Fastener 110 is equally well suited for use in blind fastening operations and can be removed without damaging either the fastener or the fastened parts.

Figure 9:
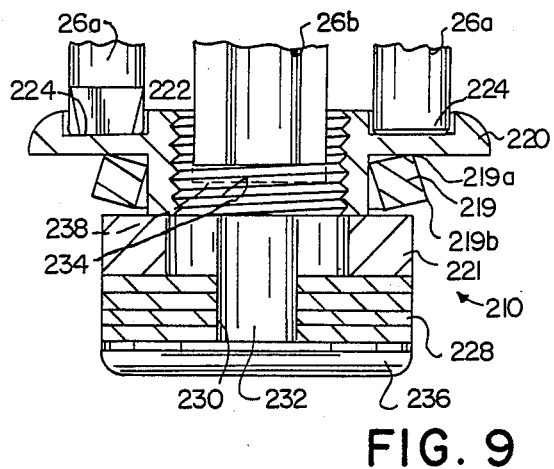
FIG. 9 is a sectional view of the fastener shown in FIG. 8, with a tool applied to retract one of the springs to its fully retracted position.
Figure 10:
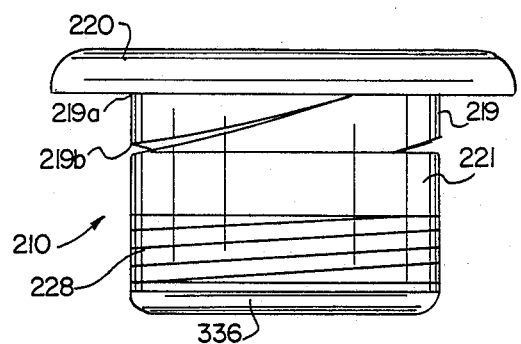
FIG. 10 is a side elevational view similar to FIG. 8 but showing bot springs in the fully retracted condition.
Figure 11:
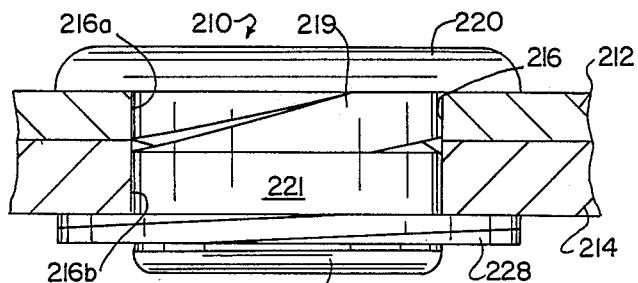
FIG. 11 is an elevational view showing the fastener of FIGS. 8-10 applied to fasten a pair of panels together.
Figure 12:
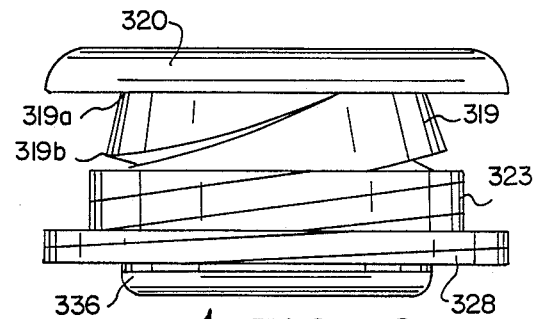
FIG. 12 is a side elevational view of a fastener constructed according to a fourth embodiment of the present invention, with the three springs included in the fastener in their undeformed conditions.

Turning to FIGS. 8–11, numeral 210 generally designates a fastener constructed in accordance with a third embodiment of the present invention. Fastener 210 is identical to fastener 110 in all respects, except thaqt a spacer 221 is included between the trusto-conical spring 219 and the double helical spring 228. As best shown in FIG. 9, the spacer 221 is a solid ring having an outside diameter substantially equal to the diameter of the aperture 216 formed in the panels 212 and 214 which are to be fastened. It is to be noted that panel 214 is somewhat thicker than panel 212, although it need not be.

The fastener 210 is installed by applying the application tool in the manner indicated previously. Initial rotation of the tool shank 26b causes spring 228 to retract radially to the fully retracted condition shown in FIG. 9. Continued rotation of the tool shank causes the stiffer spring 219 to retract, and the fastener is then inserted through aperture 216 and released after the head 220 has contacted the outer panel 212. Spring 219 then expands within aperture 216 against panel 214, and spring 228 expands to fasten the panels together in the manner previously described. The spacer 221 is located within aperture 216 and serves to space the springs 219 and 228 apart the distance necessary to accommodate the somewhat thicker panesl 212 and 214. In all other respects, the fastener 210 functions in the same manner as fastener 110.

FIGS. 12–15 illustrate a fastener 310 constructed according to a fourth embodiment of the present invention. Fastener 310 is identical to fastener 210 except that a helical spring 323 rather than a spacer is connected between springs 319 and 328. Spring 323 is preferably a double helical spring connected at one end with spring 319 and at the other end with spring 328. Spring 323 is somewhat stiffer than spring 328 but not as stiff as spring 319. In its free or undeformed condition, spring 323 has a diameter somewhat greater than the diameter of the aperture 316 formed through the panels 312 and 314 that are to be fastened.

Figure 13:
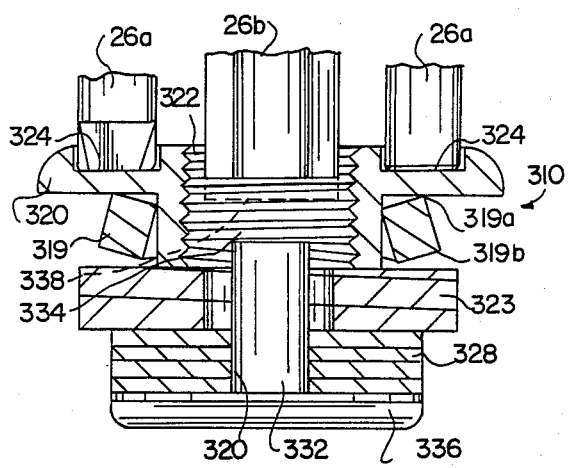
FIG. 13 is a sectional view of the fastener shown in FIG. 12, with a tool applied to retract one of the springs to its retracted condition.
Figure 14:
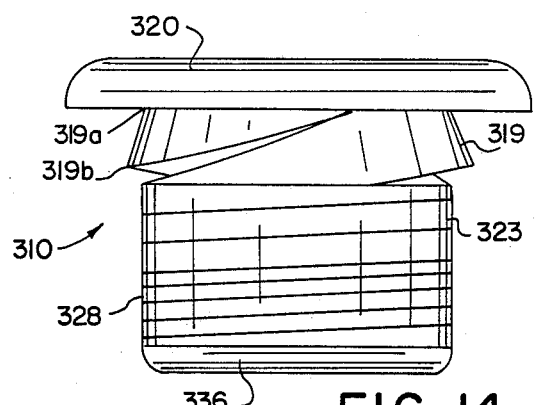
FIG. 14 is a side elevational view of the fastener shown in FIG. 12, with two of the springs in their retracted condition and one in its expanded condition.
Figure 15:
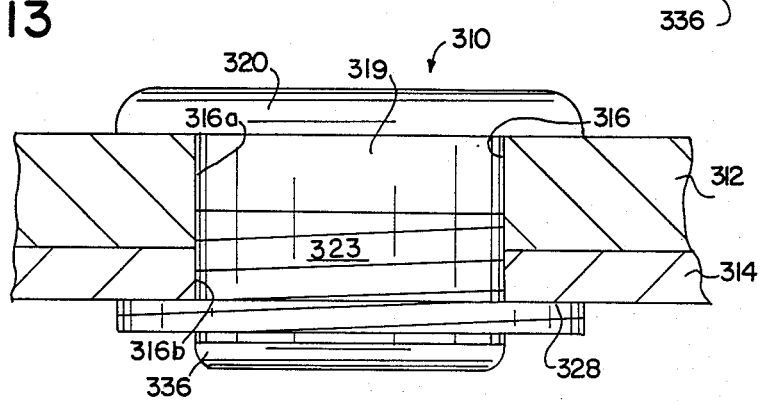
FIG. 15 is an elevational view showing the fastener of FIGS. 12-14 applied to fasten a pair of panels together.

The application tool is used to install fastener 310 in much the same manner described previously. When the tool shank 26b is rotated, the weakest spring 328 is initially retracted, as shown in FIG. 13. Continued rotation of the tool shank causes the next weakest spring 323 to retract radially to the position shown in FIG. 4 in which the diameter of spring 323 is substantially equal to the diameter of aperture 316. Additional rotation of the tool shank finally effects retracton of the stifest spring 319.

With all of the springs retracted, the fastener 310 is inserted through aperture 316, and the tool is released after the head 320 has contacted panel 312. Then, spring 328 expands in the manner described previously to fasten the panels 312 and 314 together between head 320 on one side and spring 328 on the other side. Additionally, the intermediate spring 323 acts within aperture 316 to expand against both of the panels 312 and 314 to provide additional fastening force. The frusto-conical spring 319 expands within aperture 316 against panel 312 to firmly grip the panel.

In this manner, all three springs 328, 323, and 319 assist in fastening the panels 312 and 314 together. It should be noted that the tool can be applied o retract springs 328 and 323 without effecting retraction of the strongest spring 319. Thus, spring 328 and 323 can be retracted to release panel 314 while the force provided by spring 319 maintains fastener 310 attached to the other panel 312.

It should be further noted that the parts of the fastener 310 can be suitably dimensioned so that the intermediate spring 323 is placed under tension when the fastener is fully applied to the panels. The tension force exerted by spring 323 pulls spring 328 toward the head 320, thereby compressing panels 312 and 314 against one another for additional fastening security. The parts of the fastener can be dimensioned so that springs 319 and 323 grip one or both panels. Alternatively, spring 323 can be lcoated between the panels so that the panels can be held in spaced apart positions while securely fastened together.

Figure 16:
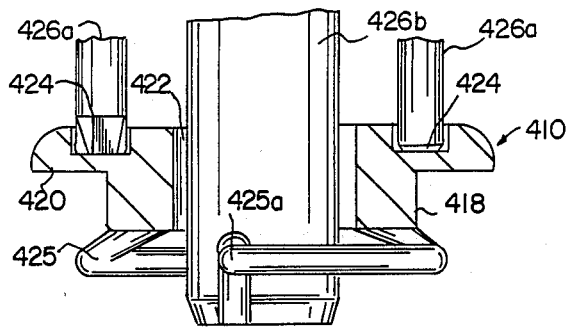
FIG. 16 is a sectional view of a fastener constructed according to a fifth embodiment of the present invention, with a tool applied thereto.
Figure 17:
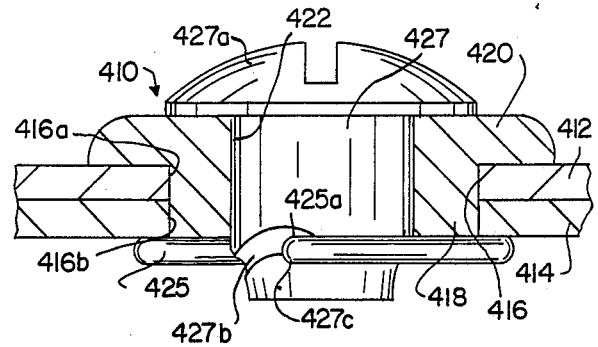
FIG. 17 is a sectional view showing the fastener of FIG. 16 applied to fasten a pair of panels together.
Figure 18:
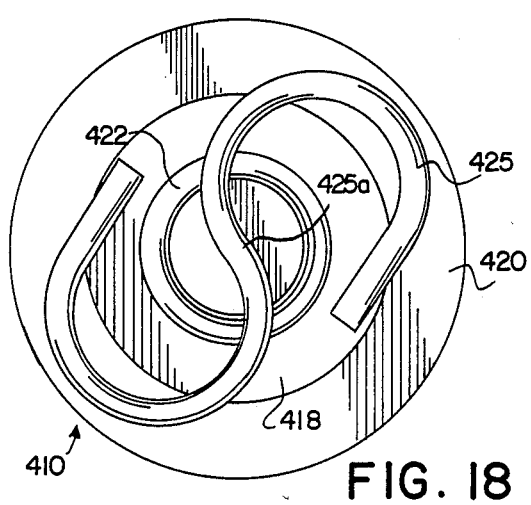
FIG. 18 is a bottom elevational view taken generally along line 18—18 of FIG. 16 in the direcitn of the arrow.

Referring now to FIGS. 16–18, numeral 410 generally designates a fastener constructed in accordance with a fifth embodiment of the present invention. The fastener 410 has a body 418 and head 420 which are substantially identical to those described in conneciton with the other embodiments. However, in place of the double helical spring utilized by the other embodiments, fastener 410 is provided with a spring 425 which is formed from spring wire and has the general shape of an S, as best shown in FIG. 18. The opposite ends of the spring wire are connected with body 418. The spring 425 has a cross bar 425a which connects the two curved portion or loops of the S shaped spring and which extends across one end of the passage 422 which is formed axially through body 418 and head 420. Passage 422 is not threaded.

In the free or undeformed state of spring 425, the lateral dimensio of the spring defined between the curved loops is greater than the diameter of the aperture 416 formed through the panels 412 and 414 which are to be fastened. However, when a torsional force is applied to the cross bar 425a, spring 425 can be retracted such that its lateral dimension is less than the diameter of the aperture 416. The tool which is used to apply fastener 410 differs somewhat from the tool described earlier in that the rotatable tool shank 426b has a slot 426c in its end. The slot 426c has a size and shape to be applied to the cross bar 425a of the S shaped spring 425.

The fastener 410 is applied by applying the tool such that its prongs 426a are received in the recesses 424 formed in head 420. The rotatable shank 426b of the tool is applied with slot 426c engaging the cross bar 425a of the spring. The shank 426b is then rotated to apply a torsional force which retracts spring 425 to the fully retracted condition in which it can be passed through the aperture 416. After head 420 has engaged panel 412, the tool is released, and spring 425 then expands such that it is too large to pass back through the aperture. The panels 412 and 414 are thereby fastened between the head 420 on one side and the expanded spring 425 on the other side.

AFter the fastener 410 has been installed in this manner, a latching stud 427 (FIG. 17) can be applied to latch the fastener in place. Stud 427 has a size to fit closely in passage 42 and is provided with a slotted head 427a which is larger than passage 422. The end of stud 427 opposite the head is provided with a spiral slot 427b having a size to closely receive the cross bar 425a of spring 425. The end of slot 427b forms a seat or detent 427c in which the cross bar 425a seats when the latching stud is applied.

The latching stud 427 is applied by inserting the shank of the stud through passage 422 with the stud oriented such that the end of slot 427b interfits with cross bar 425a. Stud 427 is then rotated (as by application of a screw driver to the slotted head 427a) through an arc sufficient to draw cross bar 25 along the slot 427b until the cross bar seats in detent portion 427c of the spiral slot. It is contemplated that rotation of stud 427 through an arc of approximately 90° will position cross bar 425a in the detent 427c. This gives the latching stud 427 the same capability as existing "quarter turn" or "quick release" fasteners. The latch stud 427 can be released and removed by turning it in the opposite direction through one quarter turn to release slot 427b from the cross bar 425a.

It is noted that the spiral slot 427b pulls the cross bar 425a toward the head 427a of the latching stud. The head 427a contacts the outside surface of the head 420 of body 418. In this manner, the latching stud 427 causes the panels 412 and 414 to be compressed between the spring 425 on one side and the fastener head 420 on the other side. After the latching stud 427 has been released and removed, the fastener 410 can be detached by using the special tool to retract spring 425 and then simply withdrawing the fastener from aperture 416.

Figure 19:
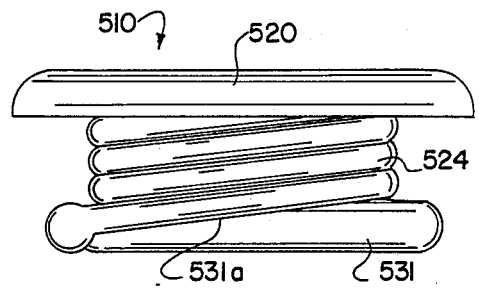
FIG. 19 is an elevational view of a fastener constructed according to a sixth embodiment of the present invention, with the springs included in the fastener in their undeformed conditions.
Figure 20:
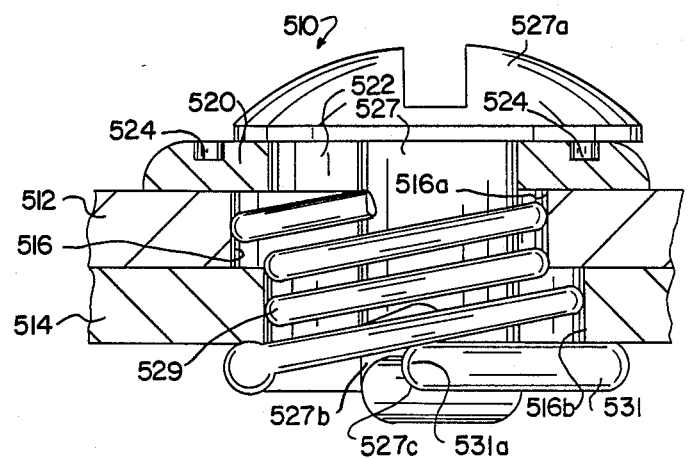
FIG. 20 is an elevational view, partially in section, showing the fastener of FIG. 19 applied to fasten together a pair of panels.

Referring now to FIGS. 19 and 20, numeral 510 generally designates a fastener constructed in accordance with a sixth embodiment of the present invention. In the fastener 510, the body is formed by a coil spring 529 which is fastened at one end to the head 520 of the fastener and at the other end to an S shaped spring 531 which is formed of spring wire in a manner similar to the S shaped spring 425 shown in FIG. 18. A cross bar 531a, is included in spring 531 and extends across one end of spring 529. Spring 531 has a lateral dimension greater than the outside diameter of the coil spring 529 and greater than the diameter of the aperture 516 in the panels 512 and 514. The length of spring 529 between head 520 and the S shaped spring 531 is slightly less than the combined thickness of panels 512 and 514.

The fastener 510 is installed by using a tool identical to that shown in FIG. 16. The slot 426c of the rotatable tool shank 426b is applied to the cross bar 531a of spring 531. The tool shank is thereafter rotated to retract the spring 531 to a size smaller than the aperture in the panels 512 and 514 that are to be fastened together. With the spring 531 in the retracted condition, the fastener is inserted through the aperture until the head 520 engages panel 512. At this point, the spring 531 will not have cleared panel 514 since the length of the coil spring 529 between head 520 and spring 531 is slightly less than the combined thickness of the panesl 512 and 514. By stretching or elongating the coil spring 529 somewhat (as by continued axial extension of the tool shank), spring 531 can be passed completely through the aperture in the panels, and the tool can then be released. At this time, spring 531 expands to its undeformed condition in which it is larger than the diameter of the aperture in the panels. The panels are thereby held between head 520 on one side and the expanded spring 531 on the other side, and the coil spring 529 is in a stretched condition to apply a compressive force to the fastened panels.

The coil spring 529 has an outside diameter substantially equal to the diameter of the parts that are to be fastened, and it has an inside diameter considerably greater than the diameter of a latching stud 527 used to latch the fastener in place on the fastened panels. The latching stud 527 is similar to stud 427 and has a slotted head 527a and a spiral slot 527b for application to the cros bar 531a of the spring 531. The slot 527b terminates in a detent 527c in which the cros bar 531a seats in the latching position of the stud. The stud 527 is a quarter turn or quick release element, which can be applied by turning it through a 90° arc, as described in connection with stud 427. Removal of the stud 527 is accomplished by turning the stud through a quarter turn in the opposite direction, and the fastener can then be removed from panels 512 and 514 by applying the tool to retract the spring 531.

Sine the diameter of stud 527 is considerably less than the inside diameter of the coil spring 529, the coil spring serves as a shock absorber when shear forces are applied to the fastened panels 512 and 514. For example, as shown in FIG. 20, the panels 512 and 514 are able to slide relative to one another such that their drilled apertures 516a and 516b are moved out of alignment when a shear force is applied. The coil spring 529 is then displaced somewhat to absorb the shock resulting from the application of the shear force, and the displaced spring thus accommodates and resists the shear load. It should be noted that the fastener 510 can be installed when the apertures in the parts that are to be fastened are misaligned somewhat, as also shown in FIG. 20.

It is to be noted that all embodiments of the fastener are easily able to withstand the application of large shear and/or tension loads, and that all embodiments are secure against vibration forces that tend to dislodge or loosen conventional fasteners. All of the fasteners can be used in "blind"0 fastening situatoins, and all can be removed and reused without damaging either the fastener or the fastened parts. The fasteners shown in FIGS. 1–16 may all be formed in a single piece and have all of the advantages of a one piece fastener, while the fasteners shown in FIGS. 17–20 contain only two pieces, including the latching stud. All of the fasteners can be used with apertures having virtually any shape, including round, oval, square and rectangular apertures. At the same time, the fasteners are self-locking and secure when properly applied. All fasteners can be used to fasten more than two parts together. As shown in FIGS. 18–20, the fastener of the present invention can be constructed to firmly compress the panels together and to act as a shock absorber in response to the application of shear loads to the fastened parts.

From the foregoing, it will be seen that this invention is one well adapted to attain all the ends and objects hereinabove set forth together with other advantages which are obvious and which are inherent to the structure.

It will be understood that certain features and sbucombinations are of utility and may be employed without reference to other features and subcombination. This is contemplated by and is within the scope of the claims.

Since many possible embodiments may be made of the invention without departing from the scope thereof, it is to be understood that all matter herein set forth or shown in the accompanying dawings is to be interpreted as illustrative and not in a limiting sense.

Having thus described the invention, I claim:

1. A fastener for installation through an aperture extending through a pair of parts to be fastened, said fastener comprising:
    a fastener body having opposite ends and carrying on one end a head having a size greater than the aperture to prevent entry of said head into the aperture;
    a first spring section connected with said body and having a size greater than the aperture in an undeformed condition, said first spring section being retractable to a size less than the aperture upon application of torsional force thereto; and
    a second spring section connected with said first spring section and having a size greater than the aperture in an undeformed condition; said second spring section being retractable to a size less than the aperture upon application of torsional force thereto,
    whereby torsional force can be applied to said spring sections to permit entry of said first spring section into the aperture and passage of said second spring section through the aperture, said spring sections expanding toward the undeformed conditions upon release of the torsional force to fasten the parts between said head on one side and said second spring section on the other side with said first spring section expanding to engage at least one of the parts at a location within the aperture.

2. The fastener of claim 1, including a spacer between said first and second spring sections, said spacer being connected with both spring section and being located within the aperture when the fastener is applied to the parts.

3. The fastener of claim 1, wherein said first spring section has a generally frusto-conical shape in the undeformed condition and presents an edge for engaging said one part.

4. The fastener of claim 1, wherein said first spring section is characterized by more stiffness than said second spring section to thereby require the application of more torque to retract said first spring section than said second spring section.

5. The fastener of claim 1, including a third spring section connected at one end to said first spring section and at another end to said second spring section, said third spring section having a size greater than the aperture in an undeformed condition and being retractable to a size less than the aperture upon application of torsional force thereto, whereby torsional force can be applied to said third spring section to permit entry thereof into the aperture with said first spring section, said third spring section expanding toward the undeformed condition to engage the other part at a location within the aperture upon release of the torsional force.

6. The fastener of claim 1, including:
- an internally threaded passage in said fastener body extending generally axially therein;
- a stud connected to said second spring section and having external threads extending into and maturing with said internally threaded passage to thereby effect application of torsional force to said spring section upon rotation of said stud relative to said body; and
- tool receiving means on said body and stud for receiving a tool to permit the tool to effect rotation of said stud relative to said body, thereby applying torsional force to said spring section to effect retracton of the spring section from the undeformed conditions thereof.

* * * * *